(12) United States Patent
Straney et al.

(10) Patent No.: US 9,194,407 B1
(45) Date of Patent: Nov. 24, 2015

(54) UNIVERSAL CLAMPS

(71) Applicant: Cuda's Customs, LLC, Merritt Island, FL (US)

(72) Inventors: Robert Dean Straney, Merritt Island, FL (US); Heather Renee Straney, Merritt Island, FL (US)

(73) Assignee: Cuda's Customs, LLC, Merritt Island, FL (US)

( * ) Notice: Subject to any disclaimer, the term of this patent is extended or adjusted under 35 U.S.C. 154(b) by 0 days.

(21) Appl. No.: 14/460,035

(22) Filed: Aug. 14, 2014

Related U.S. Application Data

(60) Provisional application No. 61/943,049, filed on Feb. 21, 2014.

(51) Int. Cl.
    *F16B 2/12* (2006.01)
    *F16B 2/06* (2006.01)

(52) U.S. Cl.
    CPC .... *F16B 2/06* (2013.01); *F16B 2/12* (2013.01)

(58) Field of Classification Search
    USPC ............... 248/229.1, 229.12, 229.14, 229.2, 248/229.22, 229.24, 230.5, 230.3, 231.41, 248/231.61, 316.4, 316.6, 218.4, 219.1, 248/219.4
    See application file for complete search history.

(56) References Cited

U.S. PATENT DOCUMENTS

| | | | |
|---|---|---|---|
| 1,777,884 A * | 10/1930 | Horix | 248/230.5 |
| 2,248,170 A | 7/1941 | Hansen | |
| 2,686,029 A | 8/1954 | Raymond | |
| 3,913,878 A | 10/1975 | Wayne | |
| 3,987,993 A | 10/1976 | Hopkins | |
| 4,256,281 A | 3/1981 | Harris | |
| 4,270,724 A | 6/1981 | McMullen | |
| 5,597,148 A | 1/1997 | Gospodarich | |
| 6,095,466 A | 8/2000 | Sener | |
| 6,227,510 B1 | 5/2001 | McMullen | |
| 6,719,254 B1 | 4/2004 | Speiser | |
| 6,719,255 B2 * | 4/2004 | Chen | 248/323 |
| 6,938,865 B1 * | 9/2005 | Day | 248/229.14 |
| 7,219,866 B2 * | 5/2007 | Depay et al. | 248/229.22 |
| 7,350,755 B1 * | 4/2008 | Harrison | 248/230.6 |
| 7,404,532 B1 * | 7/2008 | Baril | 248/218.4 |
| 8,128,045 B2 * | 3/2012 | Skaggs | 248/311.2 |
| 8,336,837 B2 | 12/2012 | Gephart | |
| 2011/0302857 A1 * | 12/2011 | McClellan et al. | 52/173.3 |

OTHER PUBLICATIONS

Roswell Wake-Air, Rope Hooks, Product C910-0019, http://www.roswellwakeair.com/series_elite/wakeboard_tower_rope_hooks/, Aug. 14, 2014, 3 pages.

* cited by examiner

*Primary Examiner* — Alfred J Wujciak
(74) *Attorney, Agent, or Firm* — Brian S. Steinberger; Law Offices of Brian S. Steinberger, P.A.

(57) ABSTRACT

Universal clamps, devices, apparatus and methods having slidable clamp portions over U shaped legs on a holder, for clamping drink holders, rod holders, utility holders, a caddy or a shelf, on any vertical, angled, and horizontal pipes, tubes, shafts, and the like. The clamp portions and holders can be formed from marine grade UV(ultraviolet) resistant polymer material. Fasteners, such as screws with threaded posts lock the clamp portions into the legs of the holder wherein the threaded posts remain protected and fully covered within the legs and the clamp member when the clamp member is locked to the holder. The holders can include a single loop, two side by side loops or a loop pivotally attachable to a base member that supports the U shaped legs.

19 Claims, 13 Drawing Sheets

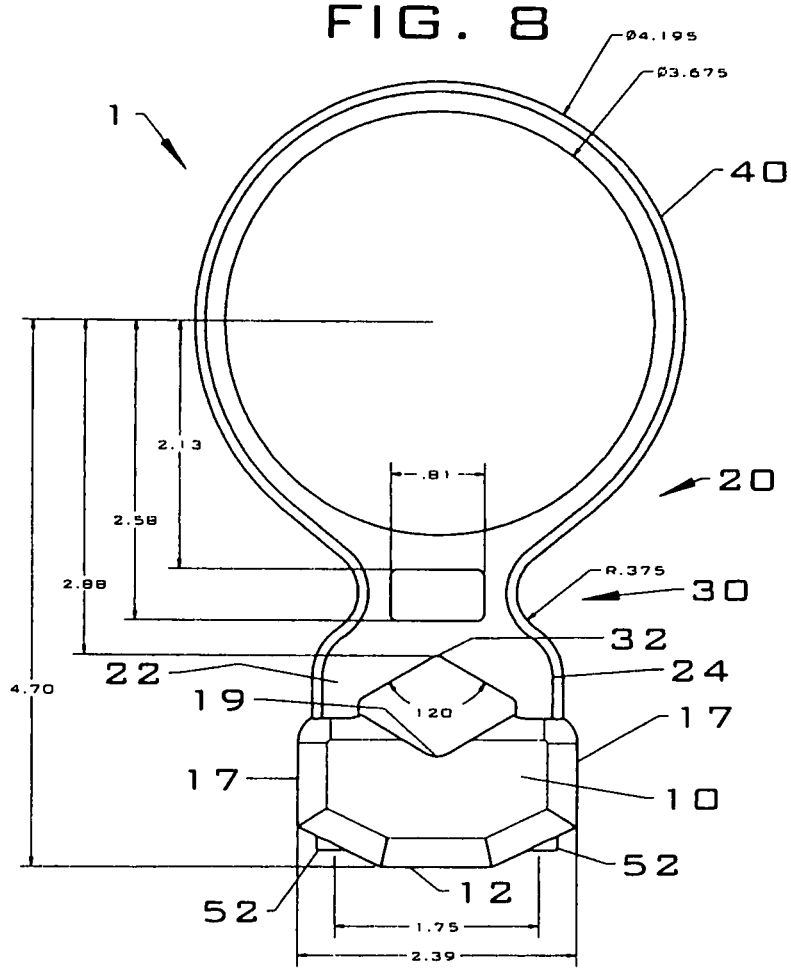

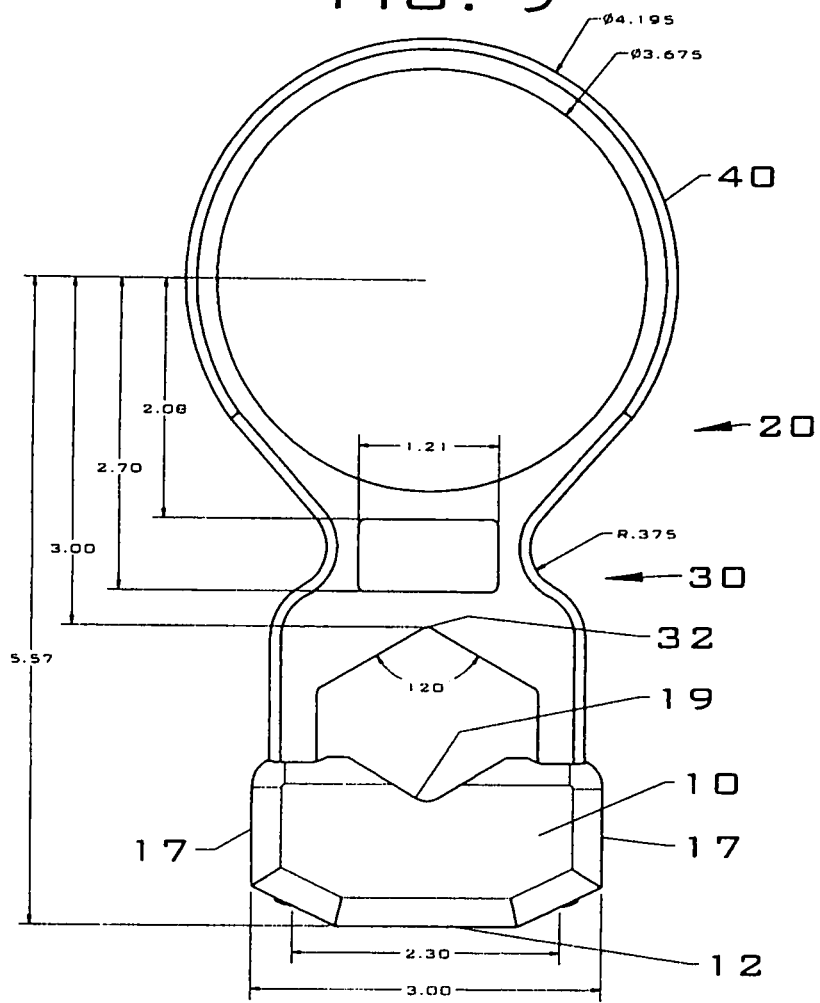

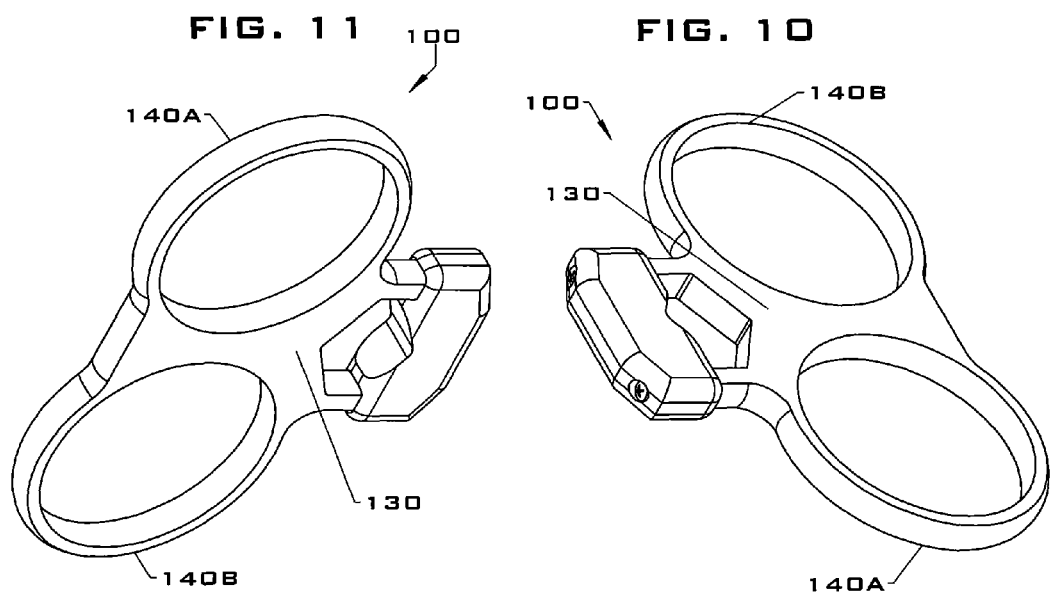

FIG. 14
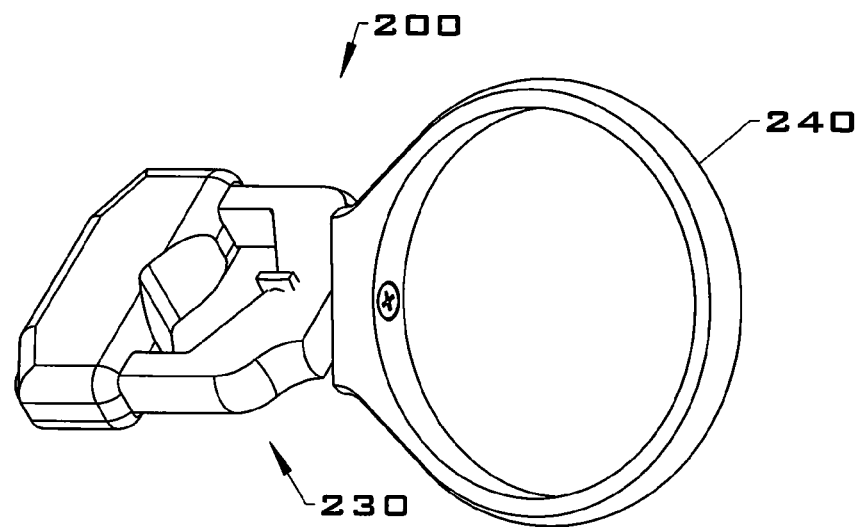
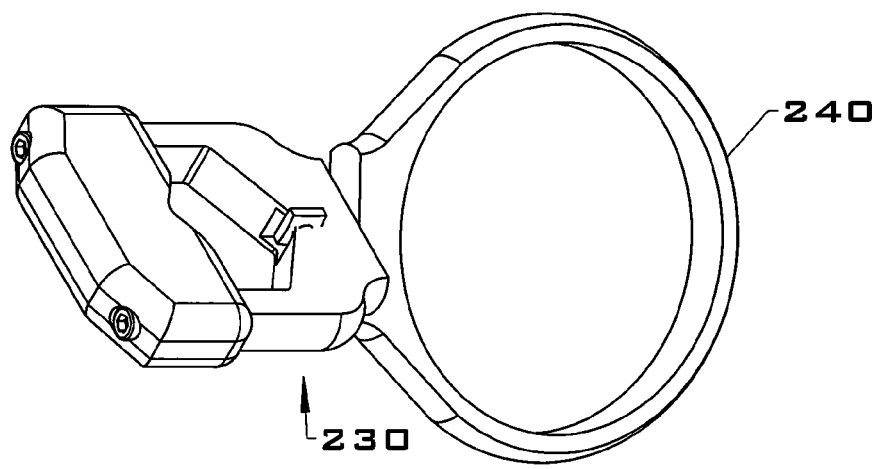
FIG. 15

UNIVERSAL CLAMPS

This application claims the benefit of priority to U.S. Provisional Application Ser. No. 61/943,049 filed Feb. 21, 2014, the entire disclosure of which is incorporated by reference.

FIELD OF INVENTION

This invention relates to clamps for drink holders and fishing rods, and in particular to novel universal clamps, devices, apparatus and methods having slidable clamp portions over U shaped legs on a holder, for clamping drink holders, rod holders, utility holders, a caddy or a shelf, on any vertical, angled, and horizontal pipes, tubes, shafts, and the like.

BACKGROUND AND PRIOR ART

Clamps used for supporting objects such as drinks and fishing rods, can cause damage to the surface of the structure being mounted, especially when the clamps are rotated about the structure.

Additionally, most clamps cannot be used as a universal holder for mounting around any vertical, horizontal, or angled pipes having the diameter range of ¾ inch to 2¼ inch outside diameter pipes, tubes, shafts, etc.

The inventors are not aware of any clamp that will fit ¾ inch OD (outer diameter) to 2 inch OD (outer diameter), and would be able to accommodate any angle of vertical, horizontal or angled pipe, tube, shaft, and the like.

Most clamps also require plural breakable parts, and are not UV (ultra violet) protected, which can fail under outdoor conditions over time.

Thus, the need exists for solutions to the above problems with the prior art.

SUMMARY OF THE INVENTION

A primary objective of the present invention is to provide novel universal clamps, devices, apparatus and methods having slidable clamp portions over U shaped legs on a holder, for clamping drink holders, rod holders, utility holders, a caddy or a shelf, on any vertical, angled, and horizontal pipes, tubes, shafts, and the like.

A secondary objective of the present invention is to provide novel universal clamps, devices, apparatus and methods versatile enough to accommodate the many different size pipes, tubes, shafts, and the like, that range from ¾ inch outside diameter to 2¼ inch outside diameter pipes, tubes, shafts, and the like, and accommodate any vertical, horizontal, angled pipe, tube, shaft, and the like.

A third objective of the present invention is to provide novel universal clamps, devices, apparatus and methods that are made of UV (ultra violet) protected marine grade polymer.

A fourth objective of the present invention is to provide novel universal clamps, devices, apparatus and methods that does not use breakable parts.

A universal clamp according to the invention can include a holder having a first end with a pair of elongated shaped legs with a space therebetween extending from a single base member, and a holding end extending from an opposite side the base member, a slidable clamp member having two parallel longitudinal through-holes, and a pair of fasteners with threaded posts, wherein the through-holes allow for the clamp member to slide over the pair of tubular shaped legs of the holder, with the fasteners locking the clamp member to the holder to a support structure passing through the space between the legs and the clamp member, and wherein the threaded posts remain protected within the legs and the clamp member when the clamp member is locked to the holder.

The holder and the slidable clamp member can each be formed from a single UV (ultra violet) resistant material. The UV (ultra violet) resistant material can be High-density polyethylene (HDPE).

The fasteners can include Allen head screws. The fasteners can include Philips head screws. The fasteners can include regular head screws.

Each of the through-holes in the clamp member can include an enlarged diameter opening adjacent to a rear end of the clamp member, and a narrower diameter opening adjacent to a front end of the clamp member, wherein the portion between the enlarged diameter opening and the narrower diameter opening forms a stop for preventing heads of the fastener from passing through the through-holes in the clamp member. The heads of the fastener can fit into a counter-bore.

The front end of the clamp member and a portion of the holder between the parallel legs can each form opposite facing V shaped indentations.

The parallel legs and the base member can be formed from a single UV(ultraviolet) resistant polymer material, and the clamp member is formed from another piece of UV(ultraviolet) resistant polymer material.

The universal clamp can include a swivel fastener for attaching the holding end to the base member, so that the holding end is pivotable about the base member.

The holding end can include a single loop for allowing for an object to be supported therein.

The parallel legs, the base member and the holding end can be formed from a single piece of UV(ultraviolet) resistant polymer material.

The holding end can include a pair of side by side loops for allowing for objects to be supported therein.

The parallel legs, the base member and the side by side loops can be formed from a single piece of UV(ultraviolet) resistant polymer material.

Further objects and advantages of this invention will be apparent from the following detailed description of the presently preferred embodiments which are illustrated schematically in the accompanying drawings.

BRIEF DESCRIPTION OF THE FIGURES

FIG. 8 is an upper view of the assembled universal clamp of the preceding figures for attachment to a small diameter support.

FIG. 9 is an upper view of the assembled universal clamp of the preceding figures for attachment to a large diameter support.

FIG. 10 is a lower perspective view of another universal clamp embodiment of the preceding figures with a double holding end.

FIG. 11 is an upper perspective view of clamp with the double holding end of FIG. 10.

FIG. 14 is a perspective view of an assembled swivel holder of FIGS. 12-13.

FIG. 15 is another perspective view of an assembled swivel holder of FIGS. 12-13.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figure 1:
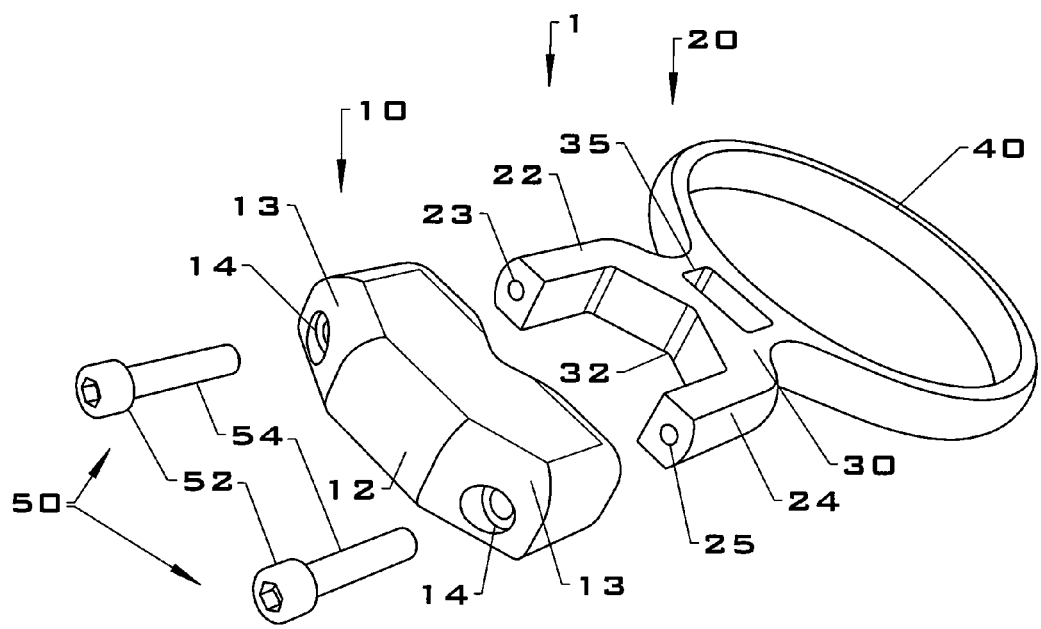
FIG. 1 is an upper rear right exploded perspective view of the universal clamp.
Figure 2:
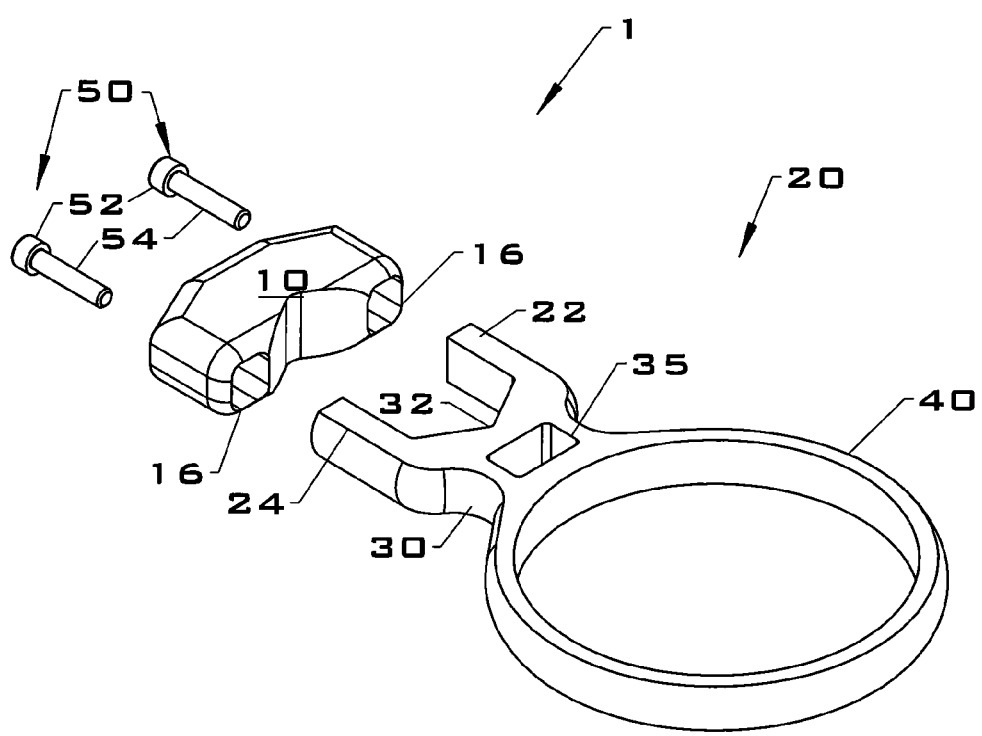
FIG. 2 is an upper front right exploded perspective view of the universal clamp.
Figure 3A:
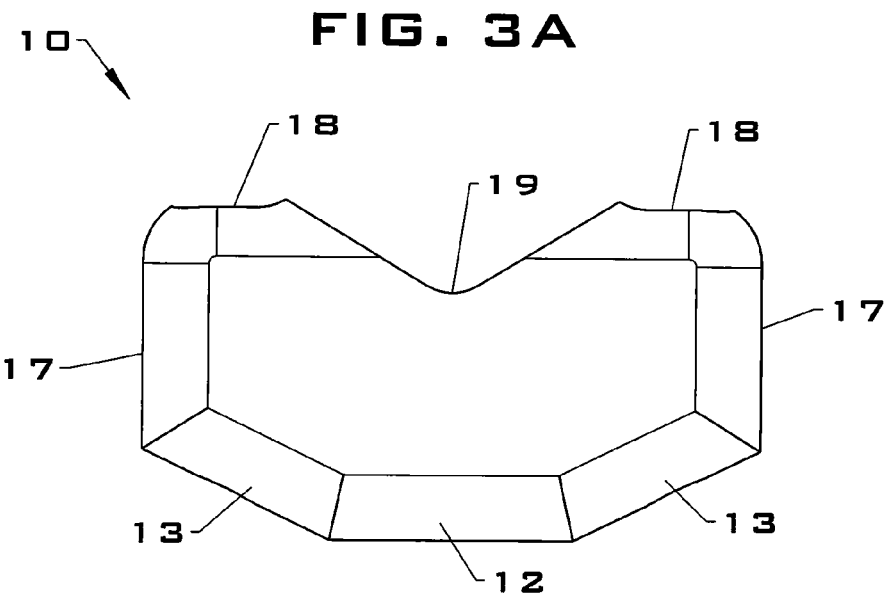
FIG. 3A is an upper view of the slidable clamp portion of the universal clamp of FIGS. 1-2.
Figure 3B:
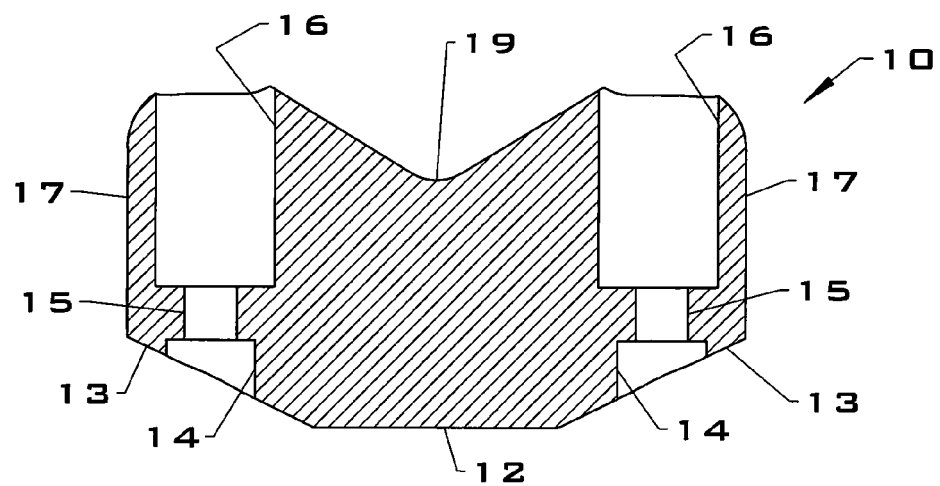
FIG. 3B is a cross-sectional view of the slidable clamp portion of FIG. 3A.

A list of components will now be described.
1 universal clamp
10 slidable clamp member
12 rear end with rounded edges
13 angled surfaces of rear end
14 enlarged rear portion of through-hole(s)
15 stop portion with narrow diameter of through-hole (s)
16 enlarged front portion of through-hole(s)
17 sides
18 front end with flat ends
19 V shaped portion
20 holder
22 first elongated leg
23 opening in end of leg
24 second elongated leg
25 opening in end of leg
30 base member
32 V shape between legs
35 slot in base member
40 holding end(loop)
50 fasteners
52 head
54 threaded shaft/post
60 support pipes/tubes/shafts
100 universal clamp with double holding ends(loops)
130 base member
140A first holding end
140B second holding end
200 universal clamp with swivel base
222 first leg
224 second leg
230 base member
232 fastening slot
235 v shape
238 upper end of base member
240 swivel attached holding end
242 bottom of holding end
245 through-hole in bottom of hooking end
250 holding end fastener
252 holding end nut FIG. 1 is an upper rear right exploded perspective view of the universal clamp 1. FIG. 2 is an upper front right exploded perspective view of the universal clamp 1. FIG. 3A is an upper view of the slidable clamp portion 10 of the universal clamp of FIGS. 1-2. FIG. 3B is a cross-sectional view of the slidable clamp portion 10 of FIG. 3A.

Referring to FIGS. 1-3B, the universal clamp 1 can include a slidable clamp member 10 with a holder 20 that can each be formed from UV(ultraviolet) resistant polymer material, such as but not limited to High-density polyethylene (HDPE) or polyethylene high-density (PEHD) polymer. The material can be a polyethylene thermoplastic made from petroleum such as marine STARBOARD® by King Plastic Corporation of Florida.

The slidable clamp member 10 can include a rear end 12 with rounded edges, an angled surfaces 13 on each side of the rear end 12, side 17 and a front end 18 with a V shaped portion 19 between the front portions 16 of the through-holes. The clamp member can include a pair of parallel through-holes passing from end of rear end of the slidable clamp member to the front end. Each of the through-holes can include an enlarged rear portion 14 with a stop portion 15 with narrow diameter and an enlarged front portion 16.

The holder 20 can include a first leg 22 with an opening 23 in an outer end, and a second leg 24 with an opening 25 in an outer end, the second leg 24 being parallel to the first leg 22. The elongated legs 22,24 can have generally rectangular cross-sectional shapes and outer curved sides. The legs 22, 24 connect to a base member 30 with a V shape 32 between the legs 22, 24. While the figures show leg shapes, the legs 22, 24 can have different cross-sectional shapes, such as but not limited to being rectangular, tubular, triangular and any other geometrical shape.

In the middle of the base member 30 can be a utility slot 35 of different sizes and dimensions that can hold items, such as but not limited to pliers, any other tools, knife, knife sheath, or other objects and the like. The utility slot 35 can be rectangular, circular, oblong, or any other geometrical shape. While one slot is shown, two or more slots of different sizes can be used.

On the opposite side of the base member 30 can be a holding end 40, such as a loop, and the like, which can support beverages (such as but not limited to bottles, cans, insulated containers), fishing rods, and the like, therein.

A pair of fasteners 50, each having an enlarged head end 52, and threaded shaft/post 54. The fasteners 50 can be selected from Allen head screws, Philip head screws, regular headed screws, and the like, and can be formed from stainless steel, galvanized metal, as well as plastics, polymers, and the like.

Figure 4A:
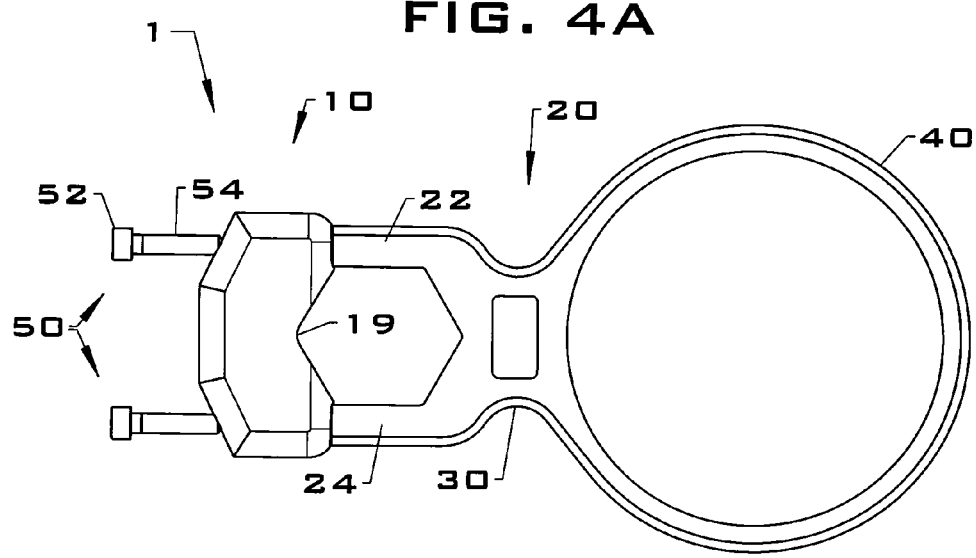
FIG. 4A is an upper view of the slidable clamp portion about to be slid over the U shaped legs of the holder of the universal clamp of FIGS. 1-2.
Figure 4B:
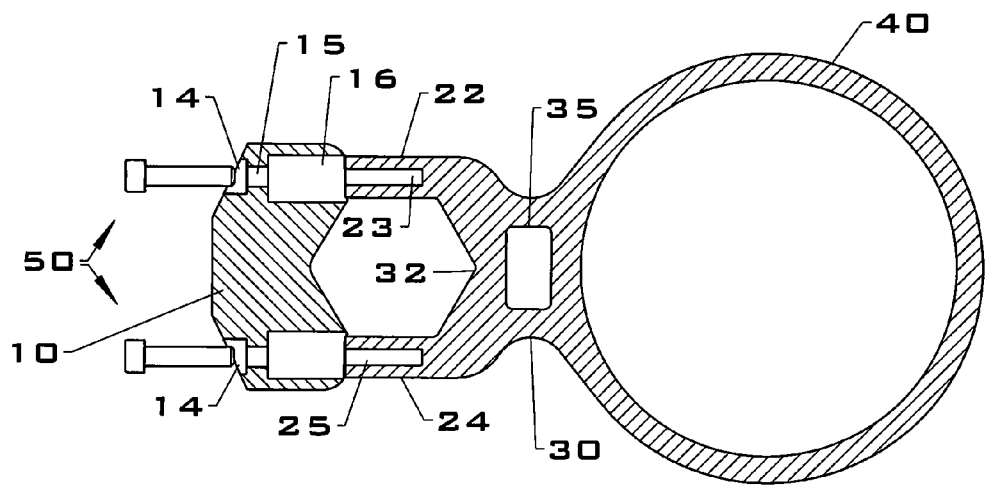
FIG. 4B is a cross-sectional view of the components of FIG. 4A.

FIG. 4A is an upper view of the slidable clamp portion 10 about to be slid over the U shaped legs 22, 24 of the holder 20 of the universal clamp 1 of FIGS. 1-2. FIG. 4B is a cross-sectional view of the components of FIG. 4A.

The ends of the threaded shafts/posts 54 of the fasteners 50 are positioned to pass into the enlarged openings 14 of the rear portion of the through-holes, while the enlarged front openings 16 of the through-holes are positioned to pass about each of the outer ends of the legs 22, 24. The inner diameter of the openings 16 can be sized to mateably receive the outer surfaces of each of the legs 22, 24.

Figure 5A:
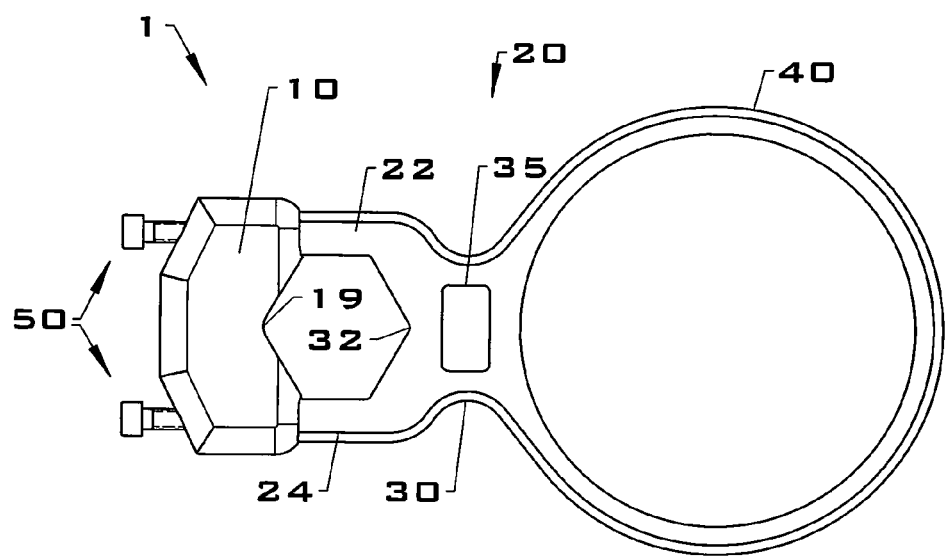
FIG. 5A is an upper view of the clamp portion being slid on the U shaped legs of the holder of FIG. 4A.
Figure 5B:
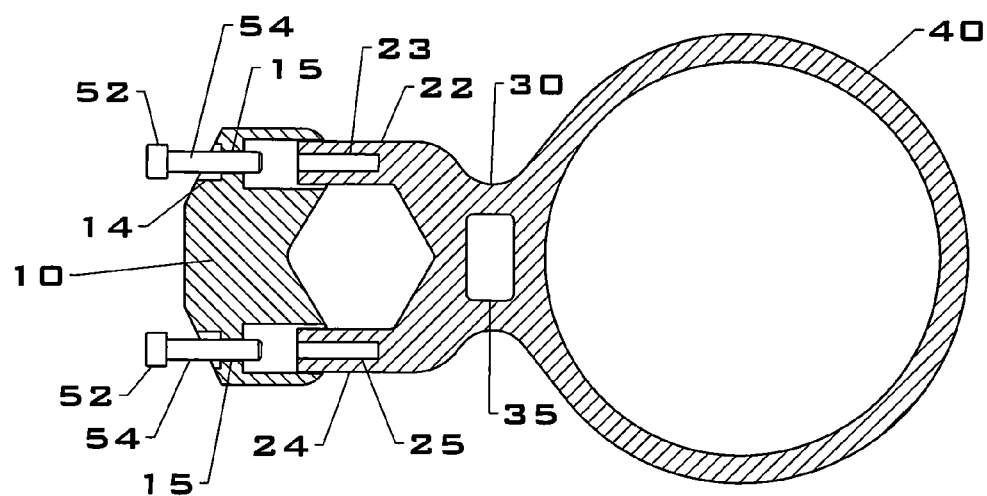
FIG. 5B is a cross-sectional view of the components of FIG. 5A.

FIG. 5A is an upper view of the clamp portion 10 being slid on the U shaped legs 22, 24 of the holder 40 of FIG. 4A. FIG. 5B is a cross-sectional view of the components of FIG. 5A.

The clamp portion 10 is slid over the legs 22, 24, while the threaded shafts/posts 54 of the fasteners 50 pass into the rear openings 14 and into the narrow openings 15 in the stop portion.

Figure 6A:
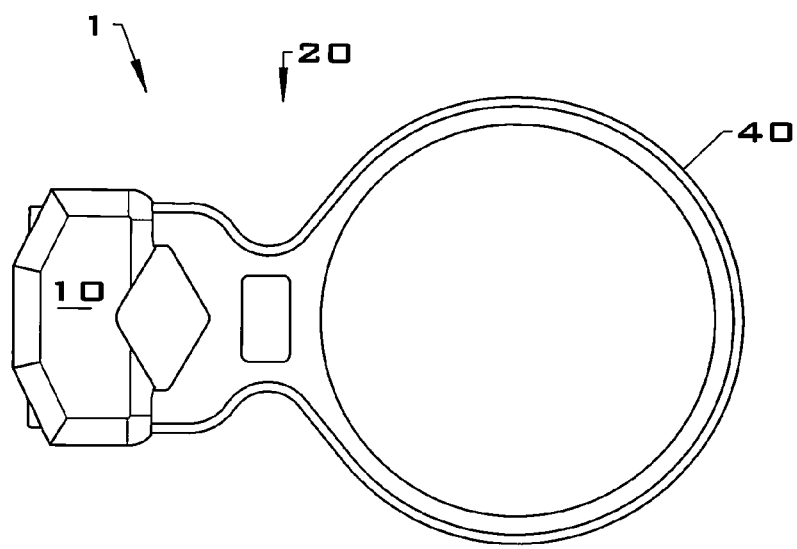
FIG. 6A is an upper view of the clamp portion assembled on the U shaped legs of the holder of FIG. 5A.
Figure 6B:
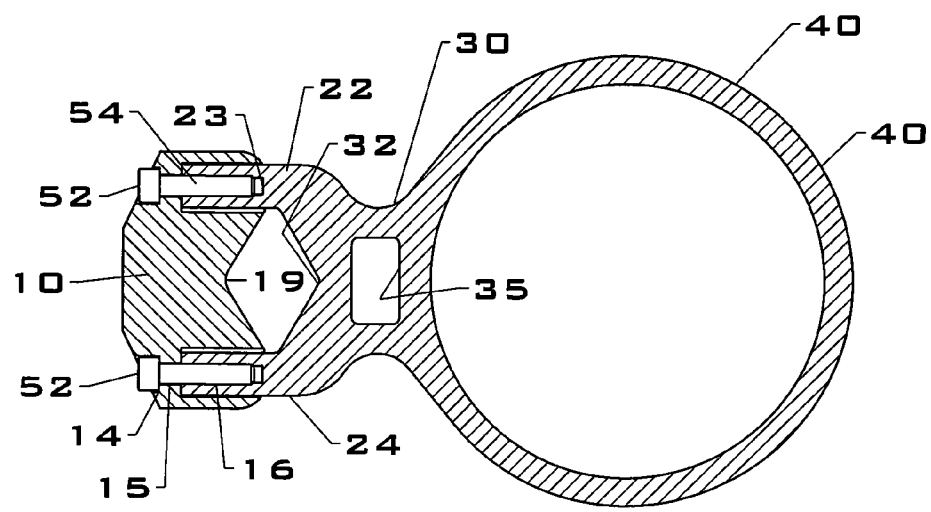
FIG. 6B is a cross-sectional view of the components of FIG. 6A.

FIG. 6A is an upper view of the clamp portion 10 assembled on the U shaped legs 22, 24 of the holder 20 of FIG. 5A. FIG. 6B is a cross-sectional view of the components of FIG. 6A.

Here, the head portions 52 of the fasteners 50 are fit into the outer openings 14 to abut against the stop portion having the narrow opening 15 with the threaded shafts/posts 54 screwing into the openings 23, 25 in the legs 22, 24. The stop portion 15 also stops the outer ends of the legs 22, 24 from passing through all of the through-holes so that triangle portions 19, 32 remain spaced apart from one another.

Figure 7:
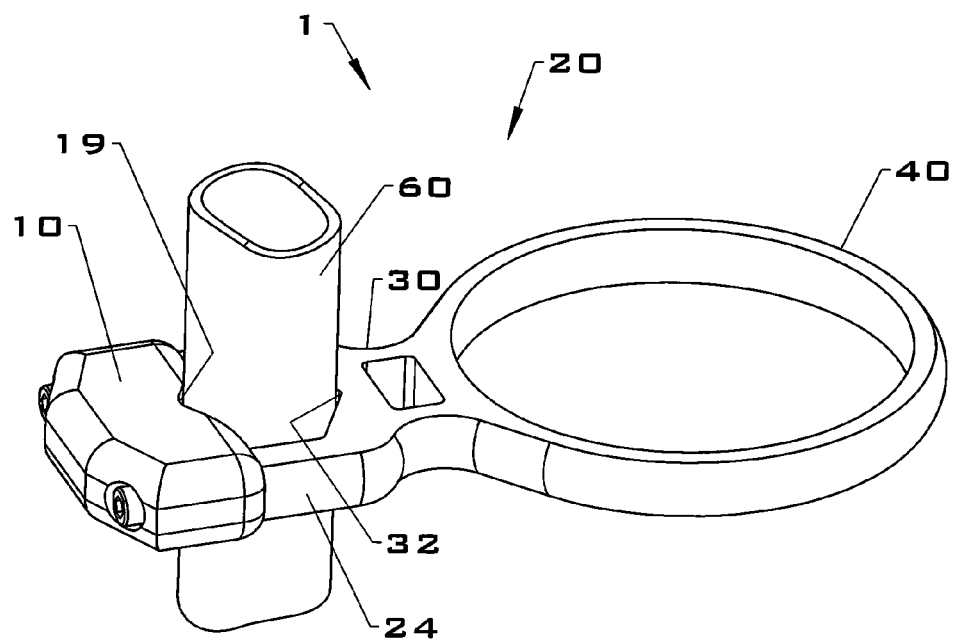
FIG. 7 is a perspective view of the assembled universal clamp on a support post.

FIG. 7 is a perspective view of the assembled universal clamp 1 on a support post 60 where the triangular portions 19, 32 allow for a universal fit about different diameter support posts 60, which can include support pipes/tubes/shafts and posts as well as railings so that the loop 40 can support objects, such as but not limited to drinks, fishing rods, and the like. The holding end 40 can support a drink holder, a utility holder, a caddy, a fishing rod, and any other type of object. For assembly, the installer can position the legs 22, 24 about a support, and slide the clamp member 10, where the fasteners 50 lock the clamp member 10 to the base member 20.

An Allen wrench can be used if the fasteners are Allen head screws, a screw driver can be used for other types of screws, and power screw drivers, and the like with adapters can also be used as needed.

The invention can further include gripping tape as needed to be wrapped about the support, such as pipe in order to keep the clamp 1 from spinning about the support, such as the pipe. Tape can be used when desired to keep the clamp end from spinning relative to the underlying support.

FIG. 8 is an upper view of the assembled universal clamp 1 of the preceding figures for attachment to a small diameter support, such as any vertical, angled, and horizontal pipes, tubes, shafts, and the like. Dimensions in inches are shown for the novel universal clamp 1, where the width of slidable clamp member 10 between outer sides 17 can be approximately 2.39 inches with the spacing between fastener heads 52 attached to respective legs 22, 24 can be approximately 1.75 inches, the length between a center point of hooking end(loop) 40 and the rear end 12 can be approximately 4.70 inches.

FIG. 9 is an upper view of the assembled universal clamp 1 of the preceding figures for attachment to a large diameter support, such as any vertical, angled, and horizontal pipes, tubes, shafts, and the like. Dimensions in inches are shown for the novel universal clamp 1, where the width of slidable clamp member 10 between outer sides 17 can be approximately 3.00 inches with the spacing between fastener heads 52 attached to respective legs 22, 24 can be approximately 2.30 inches, the length between a center point of hooking end(loop) 40 and the rear end 12 can be approximately 5.57 inches.

Figure 12:
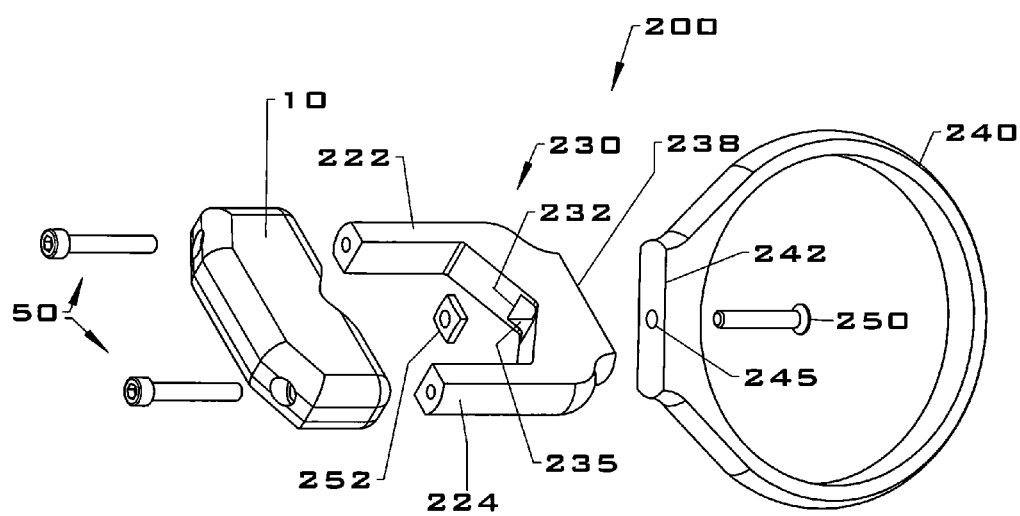
FIG. 12 is an exploded perspective view of a swivel holder version of the universal clamp of the preceding figures.
Figure 13:
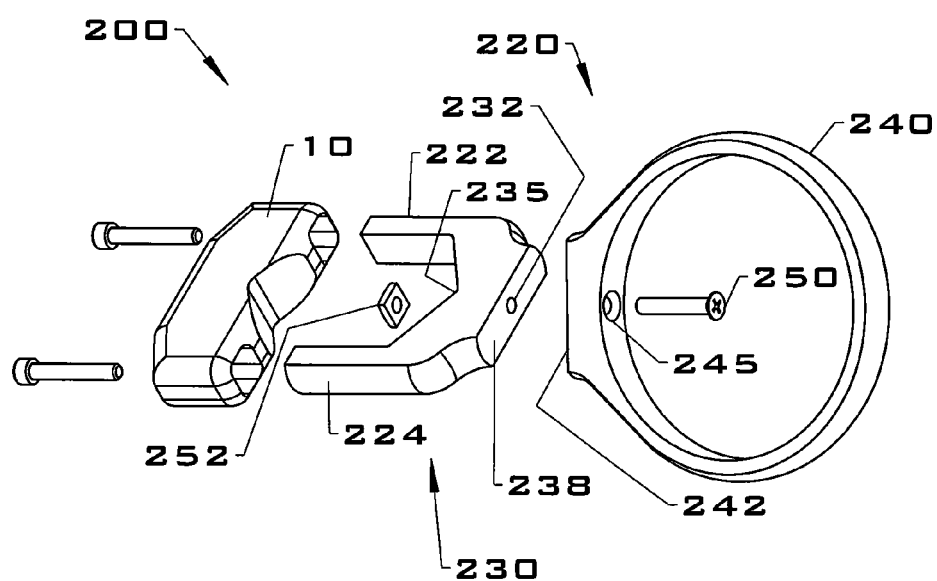
FIG. 13 is another exploded perspective view of swivel holder embodiment of FIG. 12.

FIG. 10 is a lower perspective view of another universal clamp 100 embodiment of the preceding figures with a double holding end. FIG. 11 is an upper perspective view of clamp 100 with the double holding end of FIG. 10. The universal clamp 100 is similar to the preceding embodiment with the exception of having a larger base member 130 that attaches to two side by side holding ends 140A, 140B FIG. 12 is an exploded perspective view of a swivel swivel holder 220 version of the universal clamp 200 of the preceding figures. FIG. 13 is another exploded perspective view of swivel holder 200 embodiment of FIG. 12. FIG. 14 is a perspective view of an assembled swivel holder 200 of FIGS. 12-13. FIG. 15 is another perspective view of an assembled swivel holder 200 of FIGS. 12-13.

Referring to FIGS. 12-15, the swivel clamp 200 can include similar functioning fasteners 50, and similar functioning slidable clamp member 10 to those in the previous embodiments. The swivel holder 220 portion includes similar legs 222 and v shape groove 235 as those in the previous embodiments. Here, the base member 230 includes a fastening slot 232 which runs from the v groove 235 to the upper end 238 of the base member 230. The holding end 240 can include a bottom 242 with a through-hole 245 therethrough, where a fastener 250 can be screwed into the through-hole 245 and through slot 232 with a threaded end held in place by a nut 252 positioned in the v shaped groove 235. The fastener can be a Allen head, Philips head, or regular head fastener.

When assembled, the holding end 240 can swivel relative to the base member 230 as shown. Here, the universal clamp can be positioned on angled supports and the holding end 240 rotated to a horizontal position or any other position.

The polymer plastic material that can be used in the invention allows for the clamps 1, 100, 200 to be rotatable 360 degrees about various supports without causing any damage to the supports, such as such as any vertical, angled, and horizontal pipes, tubes, shafts, and the like, where the supports can range from approximately ¾ inch to approximately 2¼ inches.

A method of making the clamps 1, 100, 200 can include the steps of taking a rectangular piece of UV(ultraviolet) resistant polymer material, such as but not limited to High-density polyethylene (HDPE) or polyethylene high-density (PEHD) polymer. The material can be a polyethylene thermoplastic made from petroleum such as marine STARBOARD® by King Plastic Corporation of Florida. Next, the user would cut out a hole to create a holding end to accommodate a cup holder, rod holder, utility holder, etc. Then the user would cut 4 universal "v" clamps, 2 sets of two "v" clamps. One set fits pipes, tubes, or shafts, etc. that fit 1¼ inch outside diameter and cinch down to ¾ inch outside diameter. The universal v clamps screwed and attached to working side of holder that mount around pipes, tubes, shaft etc. can have prongs that go within second half of v clamp so screws are hidden and clamp can be cinched down around smaller pipes, tubes, shafts, etc. The second set of v clamps can fit pipes, tubes, or shafts, etc. that fit 2 inch outside diameter and cinch down to approximately 1½ inch outside diameter. The universal clamps screwed and attached to working side of holder that mount around pipes, tubes, shaft etc. can have prongs that go within second half of v clamp so screws are hidden and clamp can be cinched down around smaller than 2 inch outside diameter pipes, tubes, shafts, and the like.

While polymer plastic is described, the invention can be formed from other materials, such as but not limited to other types of hard plastic, that can be cut, or molded, other types of polymers, as well as using metals, such as but not limited to stainless steel, treated aluminum, galvanized steel, and the like. A nonmetal spacer, separator can be used inside the clamping end to protect a metal version of the universal clamp from damage and electrolysis, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A universal clamp for supporting a receptacle, comprising:
   a holder having a first end with a pair of elongated shaped legs with a space therebetween, each of the legs having a proximate end extending from a single base member and a distal end, the distal end having an interior opening running through the distal end, each interior opening having a longitudinal axis along a longitudinal axis of each leg, the base member and the pair of elongated legs being formed from one plastic material, and the holder having a holding end extending from an opposite side of the base member;
   a slidable clamp member having two parallel longitudinal through-holes passing through both a rear end of the clamp and a front end of the clamp, each of the through-holes being enclosed on all sides, the longitudinal through-holes in the rear end of the clamp having an inner diameter sized to fit each distal end of the legs inside; and
   a pair of fasteners with threaded posts, wherein the through-holes passing through the clamp member allow for the rear end of the clamp member to slide over each of the pair of the elongated shaped legs of the holder, with the fasteners having threaded ends passing into both the through-holes in the front end of the clamp member and into the interior openings running through the distal ends of the legs locking the clamp member to the holder to a support structure passing through the space between the legs and the clamp member, and wherein the threaded posts of the fasteners remain protected within the legs and the clamp member when the clamp member is locked to the holder, wherein the front end of the clamp member and a portion of the holder between the parallel legs each form opposite facing v shaped indentations.

2. The universal clamp of claim 1, wherein the holder and the slidable clamp member are each formed from a single UV (ultra violet) resistant material.

3. The universal clamp of claim 2, wherein the UV (ultra violet) resistant material includes High-density polyethylene (HDPE).

4. The universal clamp of claim 1, wherein the fasteners include Allen head screws.

5. The universal clamp of claim 1, wherein the fasteners include Philips head screws.

6. The universal clamp of claim 1, wherein the fasteners include regular head screws.

7. The universal clamp of claim 1, wherein each of the through-holes in the clamp member include an enlarged diameter opening through the rear end of the clamp member, and a narrower diameter opening through the front end of the clamp member, wherein the portion between the enlarged diameter opening and the narrower diameter opening forms a stop for preventing heads of the fastener from passing through the through-holes in the clamp member.

8. The universal clamp of claim 1, wherein the parallel legs and the base member are formed from a single UV (ultraviolet) resistant polymer material, and the clamp member is formed from another piece of UV (ultraviolet) resistant polymer material.

9. The universal clamp of claim 8, further comprising:
   a swivel fastener for attaching the holding end to the base member, so that the holding end is pivotable about the base member.

10. The universal clamp of claim 9, wherein each of the through-holes in the clamp member include an enlarged diameter opening through the rear end of the clamp member, and a narrower diameter opening through the front end of the clamp member, wherein the portion between the enlarged diameter opening and the narrower diameter opening forms a stop for preventing heads of the fastener from passing through the through-holes in the clamp member.

11. The universal clamp of claim 10, wherein the front end of the clamp member and a portion of the holder between the parallel legs each form opposite facing V shaped indentations.

12. The universal clamp of claim 1, wherein the holding end includes a single loop for allowing for an object to be supported therein.

13. The universal clamp of claim 12, wherein the parallel legs, the base member and the holding end are formed from a single piece of UV (ultraviolet) resistant polymer material.

14. The universal clamp of claim 12, further comprising:
   a slot through single base member, the slot having a longitudinal axis perpendicular to each longitudinal axis of the elongated shaped legs, the slot adapted for holding tools therein.

15. The universal clamp of claim 1, wherein the holding end includes a pair of side by side loops for allowing for objects to be supported therein.

16. The universal clamp of claim 15, wherein each of the through-holes in the clamp member include an enlarged diameter opening through the rear end of the clamp member, and a narrower diameter opening through the front end of the clamp member, wherein the portion between the enlarged diameter opening and the narrower diameter opening forms a stop for preventing heads of the fastener from passing through the through-holes in the clamp member.

17. The universal clamp of claim 16, wherein the front end of the clamp member and a portion of the holder between the parallel legs each form opposite facing V shaped indentations.

18. The universal clamp of claim 17, wherein the parallel legs, the base member and the side by side loops are formed from a single piece of UV (ultraviolet) resistant polymer material.

19. The universal clamp of claim 1, wherein the front end of the clamp includes a flat exterior surface between each of the through-hole openings in the front end of the clamp member, and inwardly angled flat surface portions on both sides of the flat exterior surface.

* * * * *